United States Patent [19]

Okuno

[11] Patent Number: 5,966,236
[45] Date of Patent: Oct. 12, 1999

[54] OPTICAL SIGNAL CHANNEL COUNTER AND OPTICAL AMPLIFICATION DEVICE USING THE SAME

[75] Inventor: Hideki Okuno, Tokyo, Japan

[73] Assignee: NEC Corporation, Tokyo, Japan

[21] Appl. No.: 08/927,045

[22] Filed: Sep. 10, 1997

[30] Foreign Application Priority Data

Oct. 7, 1996 [JP] Japan ................................. 8-266112

[51] Int. Cl.⁶ .............................. H01S 3/16; H04B 10/12
[52] U.S. Cl. .................... 359/337; 359/130; 359/161; 359/341; 385/17
[58] Field of Search ..................................... 359/124, 130, 359/134, 161, 337, 341; 385/1, 17; 372/33

[56] References Cited

U.S. PATENT DOCUMENTS

| | | | |
|---|---|---|---|
| 4,592,043 | 5/1986 | Williams | 370/3 |
| 5,467,213 | 11/1995 | Kaede et al. | 359/175 |
| 5,631,758 | 5/1997 | Knox et al. | 359/127 |
| 5,636,301 | 6/1997 | O'Sullivan et al. | 385/24 |
| 5,680,247 | 10/1997 | Okuno | 359/341 |
| 5,764,404 | 6/1998 | Yamane et al. | 359/341 |
| 5,861,980 | 1/1999 | Ono | 359/341 |

FOREIGN PATENT DOCUMENTS 817415 1/1998 Russian Federation .
2209101 4/1989 United Kingdom .

*Primary Examiner*—Nelson Moskowitz
*Attorney, Agent, or Firm*—Whitham, Curtis & Whitham

[57] ABSTRACT

Disclosed is an optical amplification device comprising a pulser for pulsing a multi-channel signal which has been wavelength division multiplexed; a pulse signal disperser for dispersing the pulsed signal at each wavelength and outputting a dispersed pulse signal; and an optoelectronic converter for converting the dispersed pulse signal to an electrical signal. The number of channels of a multi-channel signal can be counted by counting the number of peaks in a time waveform of the electrical signal. The pulse signal disperser can be realized by using a high dispersion medium having high wavelength dispersion. The pulser can be realized by using an optical switch utilizing a mechanical, acousto-optical or electro-optical effects. The optical signal channel counter can be applied in an optical amplification device and stable optical amplification can be performed by counting the number of channels of an inputted optical signal and outputting pump light in compliance with said number of channels. The number of channels of a multi-channel signal can thus be counted accurately and the configuration of the counter which executes counting can be simplified.

10 Claims, 4 Drawing Sheets

Fig.4C CURRENT  TIME

OPTICAL SIGNAL CHANNEL COUNTER AND OPTICAL AMPLIFICATION DEVICE USING THE SAME

BACKGROUND OF THE INVENTION

1. Field of the Invention

The present invention relates to a channel counter for counting the number of multiplexed channels of an optical signal in which optical signals with a plurality of mutually differing wavelengths have been wavelength division multiplexed and also to an optical amplification device for wavelength division multiplexing transmission using the same.

2. Description of the Related Art

Wavelength division multiplexing transmission is a method of increasing transmission capacity in lightwave transmission by using signals with a plurality of mutually differing wavelengths. Since this method requires lightwaves to be combined at the transmitter and divided at the receiver, loss occurs due to these combining and dividing operations. Optical amplification devices are often used to compensate for combining/dividing loss and transmission line loss.

Semiconductor optical amplifiers, Raman fiber amplifiers, Brillouin fiber amplifiers and rare-earth-doped fiber amplifiers are examples of such optical amplification devices. In particular, an erbium-doped fiber amplifier (hereinafter abbreviated to EDFA) which is a type of rare-earth-doped fiber amplifier is frequently used for the reasons that it is not polarization dependent and can be pumped by a semiconductor laser.

Generally, the output level of the EDFA is controlled so as to be constant.

In a conventional configuration of an EDFA, for instance, a portion of the wavelength division multiplexed signal is split by means of an optical coupler injected into the output portion of the EDFA and converted to electric current by a PD module. The output level is kept constant by controlling the pumping laser module by using an optical amplification controller to maintain the current at a constant value.

However, in wavelength division multiplexing transmission, not all of a number of signals determined beforehand are transmitted. In other words, the output level of each channel changes as a result of change in the number of channels of the wavelength division multiplexing signal being inputted.

A control method for limiting this change in output level is to change the output level setting in accordance with the number of channels of the multi-channel signal. A channel counter for counting the number of channels of the multi-channel signal is required in order to perform this controlling operation.

In a configuration of a conventional channel counter, a multi-channel signal inputted to the channel counter is divided into 4 by a 1×4 optical coupler and an optical filter module, for example, a fiber grating extracts the signal at each wavelength. A photoreceiver converts each of the signals to electric current and a channel counter counts the number of channels.

A first disadvantage of the above-mentioned conventional configuration is that the circuit configuration becomes complex. In other words, the number of splits, fiber gratings and photoreceivers must all be the same as the number of channels counted.

A second disadvantage is that an increase in the total number of channels cannot be accommodated. This is because it is not possible to count a number of channels which exceeds the number of splits.

There is an additional problem that, since only signals with wavelengths to which the optical filter is transparent can be counted, it is not possible to accommodate modifications to the wavelength placement of every channel.

SUMMARY OF THE INVENTION

It is therefore the object of an optical signal channel counter of the present invention to provide a channel counter with a simple configuration which is not subject to the constraints of optical filters and the like, and an optical amplifying device for wavelength division multiplexing signal transmission using the same.

A channel counter of the present invention comprises an optical signal pulser to which is inputted a multi-channel signal consisting of a plurality of signals with mutually differing wavelengths which have been multiplexed, and the optical signal pulser pulses this wavelength division multiplexing signal and outputs a pulse signal; a pulse signal disperser for dispersing the pulse signal at each wavelength and outputting a dispersed pulse signal; and an optoelectronic converter for converting the dispersed pulse signal to an electrical signal. A channel counter of the present invention counts the number of signal channels by counting the number of peaks in a time waveform of the electrical signal.

A channel counter of the present invention comprises an optical signal pulser to which is inputted a multi-channel signal consisting of a plurality of signals with mutually differing wavelengths which have been multiplexed, and the optical signal pulser pulses this wavelength division multiplexing signal and outputs a pulse signal; a pulse signal disperser, one end of which is connected to the output side of the signal pulser, for dispersing the pulse signal at each wavelength and outputting a dispersed pulse signal from the other end; a reflecting portion, one end of which is connected to the other end of the pulse disperser, for reflecting a dispersed pulse signal and outputting it back to the pulse signal disperser; and a optoelectronic converter for converting a dispersed pulse signal into an electrical signal. Furthermore, an optical coupler is disposed between the output side of the signal pulser and one end of the pulse signal disperser for outputting a pulse signal to the pulse signal disperser and also for outputting a dispersed pulse signal outputted from the pulse signal disperser to the optoelectronic converter. The channel counter counts the number of signal channels by counting the number of peaks in a time waveform of the electrical signal.

The signal pulser utilizes an optical switch comprising a mechanical switch, an acousto-optically effective element or an electro-optically effective element, for instance. A pulse signal fractionizing circuit is a wavelength dispersion medium in which propagation velocity varies in accordance with the pulse signal wavelength, for example a dispersion compensation fiber. Alternatively, a charped grating or a fiber grating may be used as the wavelength dispersion medium.

The optical coupler is realized by means of a directional optical coupler or a circulator.

An optical amplification device of the present invention uses a channel counter having the characteristics described above. In other words, an optical amplification device of the present invention comprises an optical fiber for amplification which amplifies an optical signal inputted thereto and outputs an amplified optical signal; a pump light source for outputting pump light; an optical combiner for coupling pump light to the optical fiber for amplification; and a first optical splitter for splitting one portion of the amplified optical signal and outputting a split amplified signal. An optical amplification device of the present invention further comprises a pump light output controller for detecting the level of the split amplified signal, controlling the output of pump light and stabilizing the amplified signal output at a predetermined level. Furthermore, an optical amplification device of the present invention comprises the optical signal channel counter described above. The optical signal channel counter counts the number of signal channels contained in a split amplified signal which has been inputted thereto and outputs the count result to the pump light output controller. The pump light output controller has a level setter for setting the pump light output level based on the number of channels.

An optical amplification device of the present invention comprises the same basic functions as the optical amplification device described above and further comprises a second optical splitter for splitting one portion of an optical signal and outputting a split optical signal, and the above-mentioned optical signal channel counter. The optical signal channel counter counts the number of signal channels contained in an amplified signal which has been inputted thereto and outputs the count result to the pump light output controller. The pump light output controller has a level setter for setting the pump light output level based on the number of channels.

The basic principle of a channel counter of the present invention is to take advantage of the fact that the time taken for optical signals to pass through a high dispersion medium differs according to signal wavelength by time-dividing a multi-channel signal to the signals of each individual channel and counting the number of channels using an electric circuit. The optical circuit can thereby be realized with a simple configuration using one optical switch, one high dispersion medium and one photoreceiver. Moreover, provided that the wavelength band of the high dispersion medium is not exceeded, the same circuit can be used irrespective of the number of channels and the wavelength placement of the channels.

BRIEF DESCRIPTION OF THE DRAWINGS

The above and other objects, features and advantages of the present invention will become more apparent from the following detailed description when taken in conjunction with the accompanying drawings wherein:

FIGS. 4(a)–4(c) are timing chart depicting a pulse in a channel counter of the present invention. In this diagram, 4a shows intensity of lightwaves inputted to a high dispersion medium; 4b shows intensity of lightwaves inputted to a photoreceiver; and 4c shows a current waveform of a photoreceiver.

DETAILED DESCRIPTION OF THE PREFERRED EMBODIMENTS

Before explaining an optical signal channel counter of the present invention, the configuration of a conventional counter will first be explained to facilitate understanding of the invention.

Figure 1:
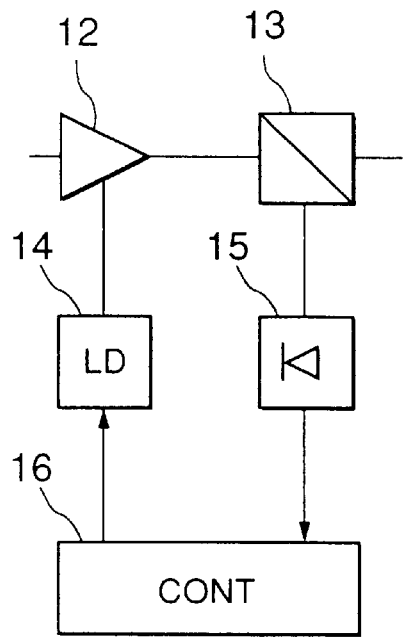
FIG. 1 is a diagram depicting a control system of a conventional optical amplification device.

FIG. 1 is a block diagram showing an example configuration of a conventional EDFA. In this example, one portion of a multi-channel signal is split by an optical coupler 13 inserted to the output portion of the EDFA and is converted to electric current by a PD module 15. A optical amplification controller 16 controls the pumping laser module 14 so that the value of this current is constant. As a result, light output is maintained at a constant level.

However, not all of a predetermined number of optical signals are transmitted in wavelength division multiplexing transmission. For instance, in a case where light output level has been set at 40 mW, the light output of each channel is 10 mW when a 4-channel multi-channel signal is being inputted. But when a 2-channel multi-channel signal is inputted, the light output for each channel is 20 mW. In other words, the light output level of each channel varies according to changes in the number of channels of the multi-channel signal being inputted.

A control method for limiting this change in output level is to change the output level setting in accordance with the number of channels of the multi-channel signal. A channel counter for determining the number of channels of the multi-channel signal is required in order to perform this control operation.

Figure 2:
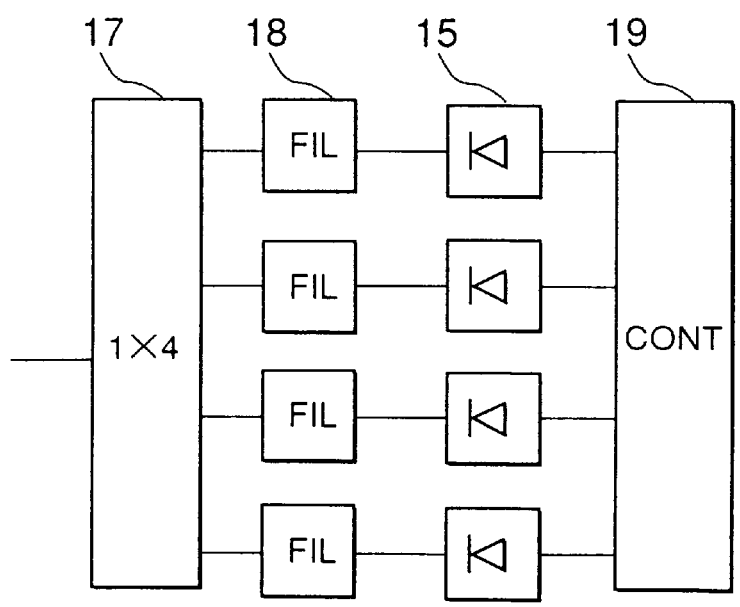
FIG. 2 is a diagram showing a configuration of a conventional channel counter.

FIG. 2 is a block diagram showing an example configuration of a conventional channel counter. In this example, a multi-channel signal inputted to the channel counter is split into 4 using a 1×4 optical coupler 17. An fiber grating 18 then extracts an optical signal at each wavelength, a photoreceiver 15 converts each of the signals to current and a channel counter 19 counts the number of channels.

A first disadvantage of the conventional configuration described above is that the circuit configuration becomes complex. In other words the numbers of splits, fiber gratings and photoreceivers must all be the same as the number of channels counted.

A second disadvantage is that the conventional configuration cannot accommodate an increase in the total number of channels since it is not possible to count a number of channels which exceeds the number of splits. There is also a disadvantage that modifications to the wavelength placement of all channels cannot be accommodated since only optical signals with wavelengths to which the optical filter is transparent can be counted.

A first embodiment of an optical signal channel counter of the present invention will next be explained with reference to the diagrams.

Figure 3:
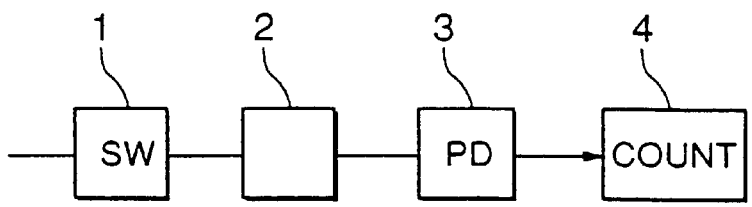
FIG. 3 is a block diagram showing a configuration of a channel counter of the present invention in a first embodiment.

FIG. 3 is a block diagram depicting a configuration of a first embodiment of an optical signal channel counter of the present invention. As the diagram shows, optical switch 1 is an optical component for switching signal propagation ON/OFF from input to output. A high dispersion medium 2 is connected to the output side of the optical switch 1. The high dispersion medium 2 has wide wavelength dispersion in the band of the multi-channel signal and propagation velocity within the medium differs depending on signal wavelength. A photoreceiver 3 is connected to the output side of the high dispersion medium 2. The photoreceiver 3 is an optical component which converts an inputted optical signal to electric current. A peak counter 4 is connected to the photoreceiver 3 in order to count the number of peaks in the time waveform of the photoreceiver current.

The operation of FIG. 3 will next be explained with reference to the diagram.

The optical switch 1 switches ON instantly when channel counting commences, an inputted multi-channel signal is pulsed in a single operation and is then launched into the high dispersion medium.

Figure 4A:
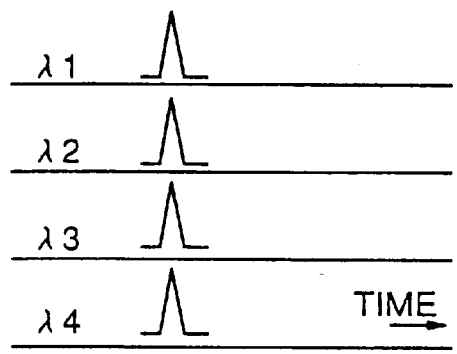
Figure 4B:
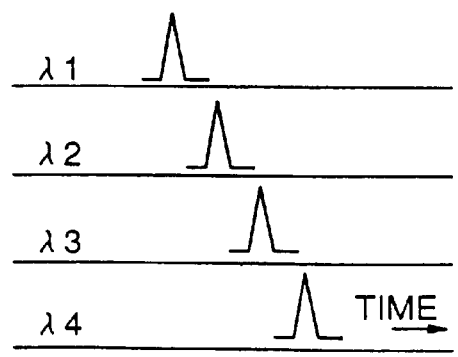
Figure 4B:

FIG. 4a shows the timing of the optical signal from each channel in a multi-channel signal which has been pulsed. As the diagram shows, signals from all the channels are propagating with identical timing at the input portion of the high dispersion medium. Since propagation velocities vary within the high dispersion medium depending on signal wavelength, at the output portion of the high dispersion medium shifts have occurred in the timing of signals of all channels. This state is depicted in FIG. 4b. The photoreceiver 3 receives the multi-channel signal in which timing shifts have occurred and converts it to current.

FIG. 4c shows a current waveform of photoreceiver 3. The number of channels of the multi-channel signal can be counted by counting the number of peaks in this waveform by means of an electrical circuit.

Next, a second embodiment of an optical signal channel counter of the present invention will be explained in detail with reference to the diagrams.

Figure 5:
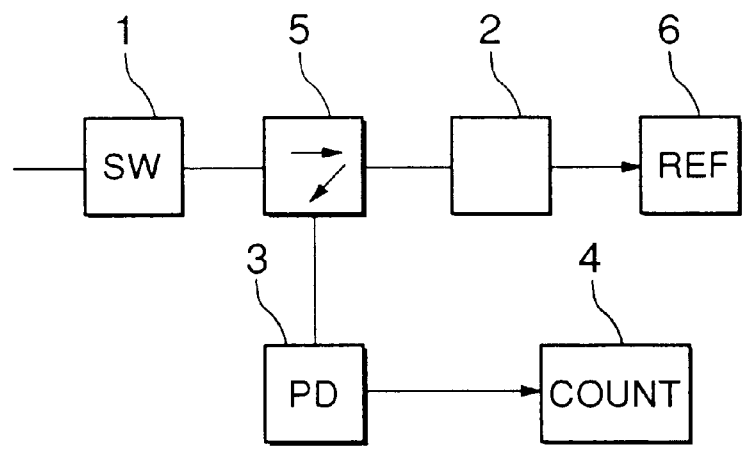
FIG. 5 is a block diagram showing a configuration of a channel counter of the present invention in a second embodiment.

FIG. 5 is a block diagram showing a configuration of a second embodiment of the present invention.

As FIG. 5 shows, optical switch 1 is an optical component for switching signal propagation ON/OFF from input to output. An optical passive component 5 is connected to the optical switch 1, the high dispersion medium 2 and the photoreceiver 3. A signal launched from the optical switch 1 is first launched into the high dispersion medium 2 and then from the high dispersion medium 2 it is launched into the photoreceiver 3. The high dispersion medium 2 has wide wavelength dispersion within the wavelength band of the multi-channel signal and propagation velocity within the high dispersion medium 2 varies depending on signal wavelength. A reflector 6 is connected to the output of the high dispersion medium 2. The reflector 6 is an optical component for reflecting part or all of an optical signal inputted thereto. The photoreceiver 3 is an optical component for converting an inputted optical signal into electric current. A peak counter 4 which is connected to the photoreceiver 3 counts the number of peaks in a current time waveform of the photoreceiver 3.

The operation of FIG. 5 will next be explained with reference to the diagram.

According to the second embodiment, an inputted multi-channel signal is pulsed in a single operation by an optical switch 1 and is then launched into a high dispersion medium 2 via an optical passive component 5. The signal is reflected by the reflector 6 and propagated a second time through the high dispersion medium 2 and launched into the photoreceiver 3 via the optical passive component 5. Larger timing shifts than in the first embodiment can be created by propagating the signal back and forth through the high dispersion medium 2 in this way.

An embodiment of the present invention will next be explained in detail with reference to the diagrams.

Figure 6:
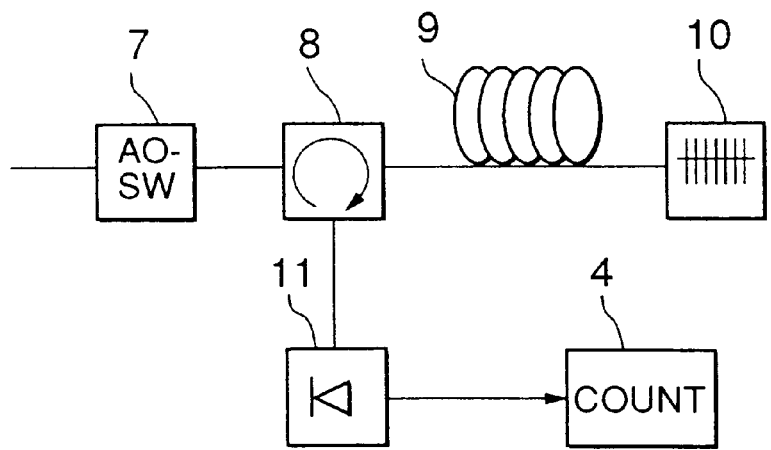
FIG. 6 is a diagram showing a more concrete configuration of a channel counter of the present invention in a second embodiment.

FIG. 6 is a diagram showing an embodiment of an optical signal channel counter of the present invention. The concrete effects of the embodiment will next be explained based on this diagram.

In the present embodiment, multi-channel signal wavelength is within a 1550 nanometer band. An inputted multi-channel signal is pulsed in a single operation by an optical switch 7 using a mechanical, acousto-optical or electro-optical effects, launched into a dispersion compensation fiber 9 via a circulator 8 and propagated through the dispersion compensation fiber 9. The entire multi-channel signal is reflected by a fiber grating 10, propagated through the dispersion compensation fiber 9 a second time and launched into a photoreceiver 11 via the circulator 8.

Since propagating the multi-channel signal through the dispersion compensation fiber 9 causes shifts to occur between the timing of the signals of all channels, it is possible to count the number of channels of a multi-channel signal by using a peak counter 4 to count the number of peaks in a time waveform of an electrical signal of the photoreceiver 11.

An optical switch 7 using acousto-optical effects was used as the optical switch here, but an electric-field absorption switch or an optical waveguide switch utilizing electro-optical effects or a mechanical switch or such like may alternatively be used. Also, a fusion optical coupler, a micro-optics coupler or a waveguide optical coupler may be used instead of the circulator 8.

A dispersion compensation fiber 9 was used for the high dispersion medium, but charped grating may acceptably be used instead. A fiber grating 10 was used for the reflector, but a metallic film reflector or a dielectric film reflector or a waveguide reflector or an optical circulator loop or an optical coupler loop is also acceptable. The reflector may perform both total or partial reflection.

An optical amplification device of the present invention using an optical signal channel counter of the present invention comprising the above-mentioned properties will next be explained.

Figure 7:
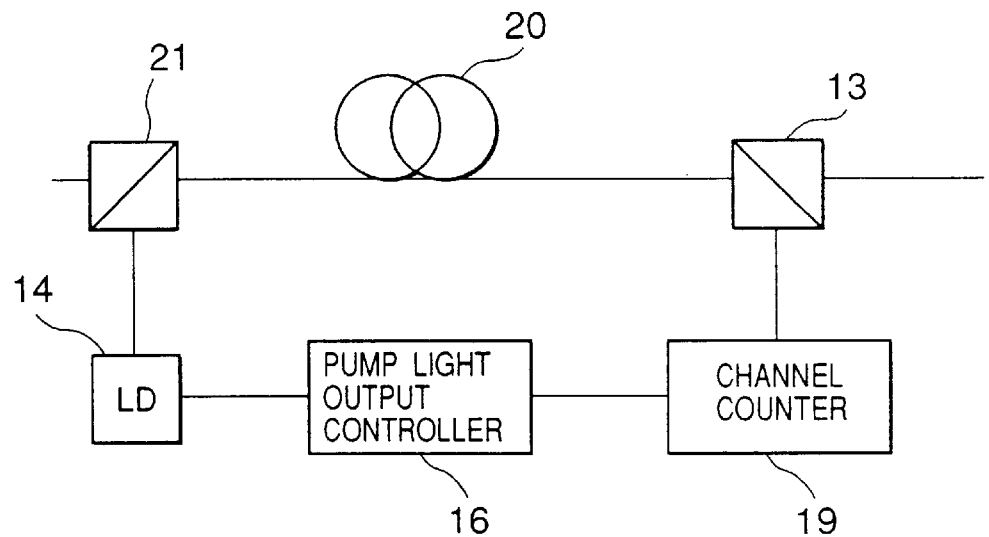
FIG. 7 is a diagram showing a configuration of an embodiment of an optical amplification device applying an optical signal channel counter of the present invention.

FIG. 7 is a diagram showing a configuration of a first embodiment of an optical amplification device of the present invention. Optical fiber 20 is an optical fiber for amplification; an erbium-doped fiber is used here. Pump light outputted from a pump light source 14 is launched into to the optical fiber for amplification 20 via an optical combiner 21. A multi-channel signal inputted from the left is amplified in the optical fiber for amplification 20 and the resulting amplified signal is outputted to the right. One portion of this amplified multi-channel signal is split by an optical splitter 13 and converted to an electrical signal, and the pump light output is feedback controlled in compliance with the level of this electrical signal so that the amplified optical signal remains constant.

In an optical amplification device of the present invention, the channel counter is disposed between the optical splitter 13 and the pump light output controller 16. The channel counter counts the actual number of channels contained in the amplified signal which has been split. The amplified signal output level is then set in accordance with the number of channels counted and pump light output is controlled so that the amplified signal output level remains constant.

Figure 8:
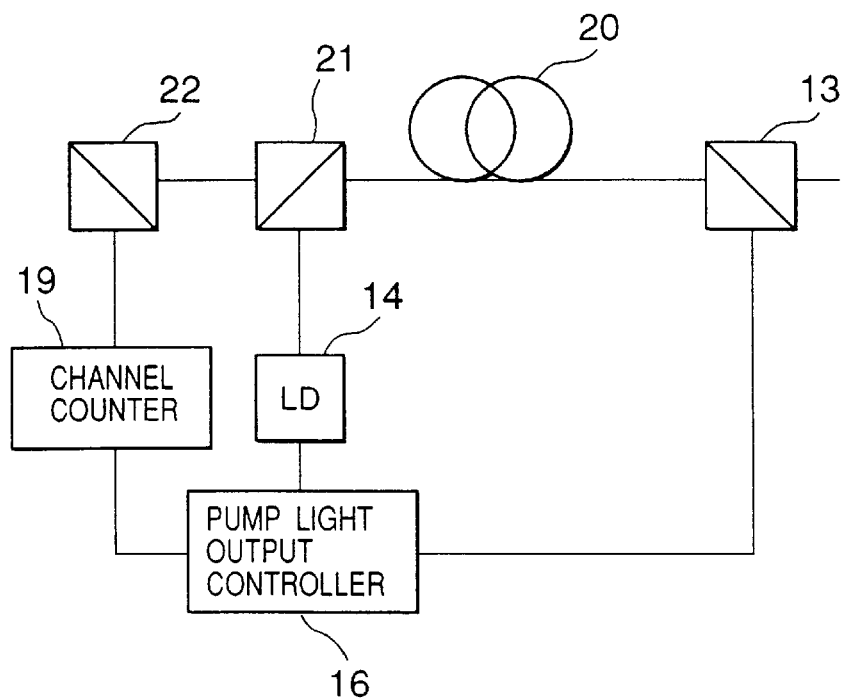
FIG. 8 is a diagram showing a configuration of another embodiment of an optical amplification device applying an optical signal channel counter of the present invention.

FIG. 8 is a diagram showing a configuration of another embodiment of the present invention, wherein the number of channels of a multi-channel signal is counted prior to amplification by disposing an optical splitter 22 before the optical combiner 21. Output level is then set in accordance with the number of channels counted.

According to either configuration, stable amplification can be carried out by appending a simple channel counter to an optical amplification device.

As explained above, according to a channel counter of the present invention, configuration of the lightwave circuit can be simplified since the configuration has no relation to the number of channels counted, and it is also possible to flexibly accommodate an increase in the total number of channels. Furthermore, since the configuration contains no optical components which only function with specific wavelengths, modification to wavelength disposition of every channel can be flexibly accommodated.

While this invention has been described in connection with certain preferred embodiments, it is to be understood that the subject matter encompassed by way of this invention is not to be limited to those specific embodiments. On the contrary, it is intended to the subject matter of the invention to include all alternatives, modifications and equivalents as can be included within the spirit and scope of the following claims.

What is claimed is:

1. An optical signal channel counter, comprising:

optical signal pulsing means, to which is inputted a multi-channel signal including a plurality of signals with mutually differing wavelengths which have been wavelength division multiplexed, for pulsing the multi-channel signal and outputting a pulse signal;

pulse signal dispersion means for dispersing the pulse signal at each wavelength and outputting a dispersed pulse signal;

optoelectronic conversion means for converting the dispersed pulse signal to an electrical signal; and peak number detection means for counting a number of signal channels by counting a number of peaks in a time waveform of the electrical signal, wherein the optical signal pulsing means is an optical switch including an element having an electro-optical effect, and wherein the wavelength dispersion medium is a dispersion compensation optical fiber.

2. An optical signal channel counter, comprising:

optical signal pulsing means, to which is inputted a multi-channel signal including a plurality of signals with mutually differing wavelengths which have been wavelength division multiplexed, for pulsing the multi-channel signal and outputting a pulse signal;

pulse signal dispersion means, one end of which is connected to an output side of the optical signal pulsing means, for dispersing the pulse signal at each wavelength and outputting a dispersed pulse signal from another end;

reflecting means, one end of which is connected to another end of the pulse dispersion means, for reflecting a dispersed pulse signal and outputting it back to the pulse signal dispersion means;

optoelectronic conversion means for converting the dispersed pulse signal into an electrical signal;

optical coupling means disposed between the output side of the signal pulsing means and said one end of the pulse signal dispersion means for outputting a pulse signal to the pulse signal dispersion means and also for outputting a dispersed pulse signal outputted from the pulse signal dispersion means to the optoelectronic conversion means; and peak number detection means for counting a number of signal channels by counting a number of peaks in a time waveform of the electrical signal, wherein the optical signal pulsing means is an optical switch including an element having an electro-optic effect, and wherein the wavelength dispersion medium is a dispersion compensation optical fiber.

3. An optical signal channel counter according to claim 1, wherein:

the optical signal pulsing means is an optical switch consisting of an element having an acousto-optic effect.

4. An optical signal channel counter according to claim 2, wherein:

the optical signal pulsing means is an optical switch consisting of an element having an acousto-optic effect.

5. An optical signal channel counter according to claim 2, wherein:

the optical coupler is a directional optical coupler.

6. An optical signal channel counter according to claim 2, wherein:

the optical coupler is a circulator.

7. An optical signal channel counter according to claim 1, wherein:

the wavelength dispersion medium is a charped grating.

8. An optical signal channel counter according to claim 2, wherein:

the wavelength dispersion medium is a fiber grating.

9. An optical amplification device comprising an optical fiber for amplification for amplifying an optical signal inputted thereto and outputting an amplified optical signal;

a pump light source for outputting pump light;

an optical combiner for coupling the pump light to the optical fiber for amplification;

a first optical splitter for splitting one portion of the amplified optical signal and outputting a split amplified signal;

a pump light output controller for detecting the level of the split amplified signal, controlling the output of pump light and stabilizing the amplified signal output at a predetermined level; wherein said optical amplification device further comprises the optical signal channel counter according to claim 1; and the optical signal channel counter counts the number of signal channels contained in a split amplified signal which has been inputted thereto and outputs the count result to the pump light output controller; and the pump light output controller has a level setter for setting the pump light output level based on the number of channels.

10. An optical amplification device comprising:

an optical fiber for amplification for amplifying an optical signal inputted thereto and outputting an amplified optical signal;

a pump light source for outputting pump light;

an optical combiner for coupling the pump light to the optical fiber for amplification;

a first optical splitter for splitting one portion of the amplified optical signal and outputting a split amplified signal;

a pump light output controller for detecting the level of the split amplified signal, controlling the output of pump light and stabilizing the amplified signal output at a predetermined level; wherein said optical amplification device further comprises:

a second optical splitter for splitting a portion of the optical signal and outputting a split optical signal; and the optical signal channel counter according to claim 1; and wherein the optical signal channel counter counts the number of signal channels contained in the split signal which has been inputted thereto and outputs the count result to the pump light output controller; and the pump light output controller has a level setter for setting the pump light output level based on the number of channels.

\* \* \* \* \*